United States Patent [19]

Coulter et al.

[11] Patent Number: 4,754,652
[45] Date of Patent: Jul. 5, 1988

[54] APPARATUS FOR MEASURING TORQUE

[75] Inventors: Clifton A. Coulter, Westminster; Edward T. Vitone, Jr., Ashburnham, both of Mass.

[73] Assignee: General Electric Company, Schenectady, N.Y.

[21] Appl. No.: 926,940

[22] Filed: Nov. 4, 1986

[51] Int. Cl.$^4$ .............................................. G01L 3/04
[52] U.S. Cl. .............................. 73/862.19; 73/862.33
[58] Field of Search ........... 73/862.33, 862.35, 862.36, 73/862.37, 862.19

[56] References Cited

U.S. PATENT DOCUMENTS

| 2,580,395 | 1/1952 | Bellizzi | 73/862.36 |
| 3,298,223 | 1/1967 | Dyer, Jr. | 73/862.33 X |
| 3,664,184 | 5/1972 | Dyer | 73/862.35 X |

FOREIGN PATENT DOCUMENTS 1803283  6/1970  Fed. Rep. of Germany ... 73/862.35

Primary Examiner—Charles A. Ruehl
Attorney, Agent, or Firm—Jerome C. Squillaro

[57] ABSTRACT

Apparatus for measuring the torque transmitted across coupled rotating shafts using load cells located between power imparting surfaces and power receiving surfaces of shafts rotating jointly about a common axis of rotation for directly determining the tangential driving force and, hence, the torque therebetween. The apparatus includes tubular spacers journaled together and supporting the shafts, load cells and power surfaces. In one form concentric overlapping spacers are provided with one spacer having a plurality of radially extending fingers projecting into corresponding slots in the other spacer. Load cells at the interface between the fingers and sides of the slots provide signals representative of torque.

3 Claims, 1 Drawing Sheet

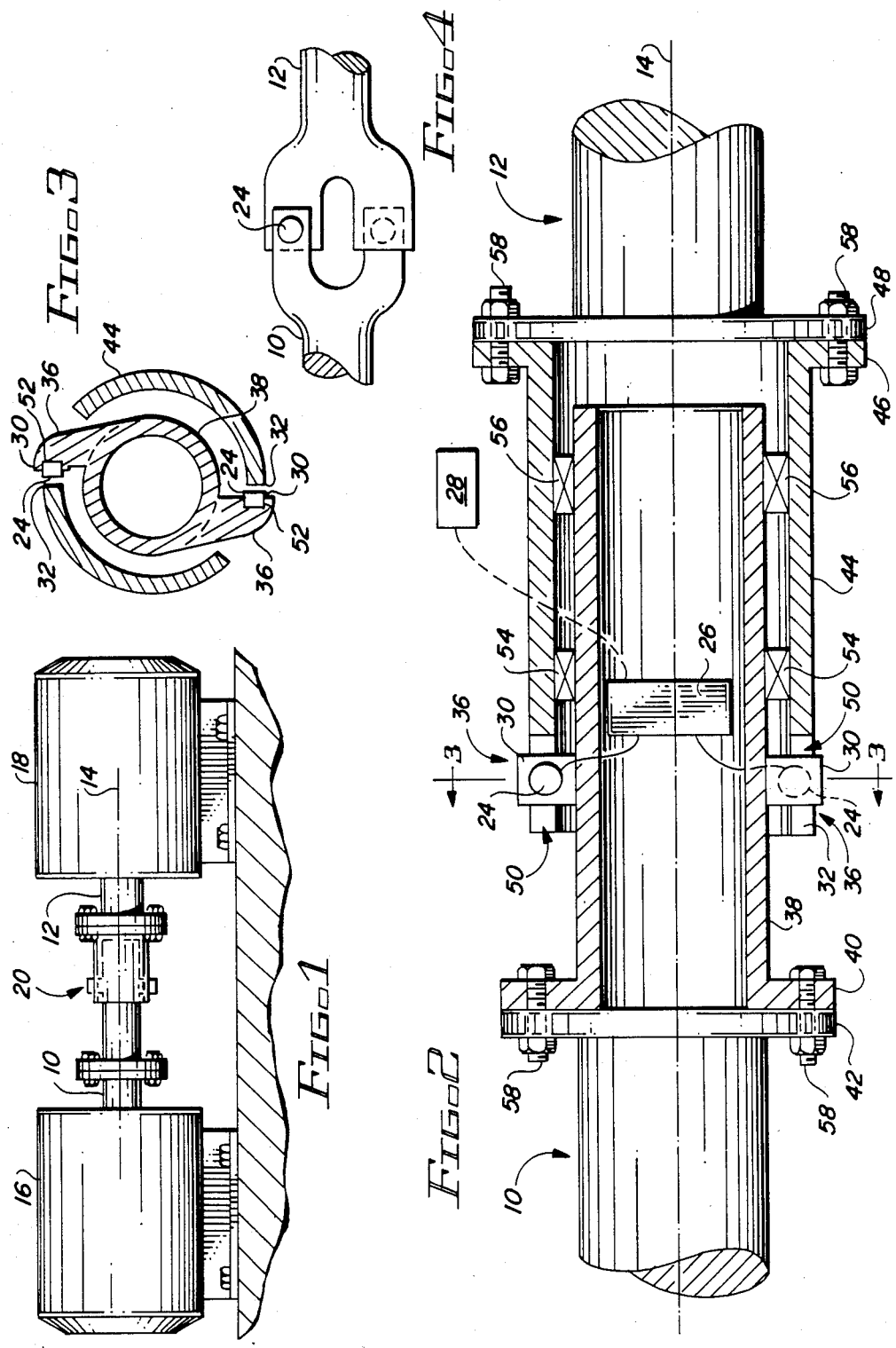

APPARATUS FOR MEASURING TORQUE

BACKGROUND OF THE INVENTION

This application is related to commonly assigned Application Ser. No. 06/926,941 filed concurrently herewith.

This invention relates to an apparatus for measuring torque transmitted across coupled rotating shafts and, more particularly, to torque measuring using load cells located between power couplings of coaxially rotating shafts for directly determining the tangential driving force at such couplings.

DESCRIPTION OF THE PRIOR ART

Many approaches have been attempted in an effort to improve torque measuring couplings that would be applicable to conventional designs of mechanical drive turbines and other machinery. In general, prior art equipment is either difficult to calibrate, has short periods of accurate service, or is of low accuracy although having a long service life. Furthermore, such prior art torque measuring devices measure torque indirectly, e.g., by determining either the angular deflection of a driven shaft or by measuring the torsional stress in a torque transmitting member. Since the measured values are very small numbers, inaccuracies may occur when attempting to measure relatively large force and torque values. Further, since one of the requisites of a successful design is to maintain a high torsional stiffness in order to minimize the impact on torsional resonance, it is obvious that the attempt to measure infinitesimal deflections is difficult. Attempts to measure torque to within $\pm\frac{1}{4}\%$ accuracy, using such small deflection, has generally been difficult.

SUMMARY OF THE INVENTION

Among the objects of the present invention is the provision of a method and apparatus for measurement of torque transmitted through a rotating coupling with high accuracy, sensitivity and reliability. This and other objects are attained in an illustrative embodiment in a torque coupling mechanism between a driving shaft and a driven shaft. The driving and driven shafts are axially aligned and rotatable together about a common axis of rotation. A first hollow cylindrical coupling member is axially coupled to the driving shaft and a second hollow cylindrical coupling member is axially coupled to the driven shaft. The hollow coupling members are of different diameters and are concentrically positioned one partially within the other. Bearings are concentrically secured to the interior surface of the exterior coupling member and the exterior surface of the interior coupling member to support the exterior member about the interior member for coaxial rotation with minimum wobble. A plurality of torque transmitting lugs or fingers extend from one of the coupling members with each finger extending into a corresponding slot formed in the other of the coupling members. The fingers exert a tangential force against sides of the slots to cause common rotation of the coupling members. Load cells are positioned at the interfaces between the fingers and sides of the slots to directly sense the tangential driving force required to cause the driven member to rotate. An electronic sensor responsive to the radial position of the cells, the number of load cells, and the sensed tangential driving force determines the torque developed between the coupling members during their rotation.

BRIEF DESCRIPTION OF THE DRAWINGS

For a more complete understanding of the nature, object, and advantages of the present invention, reference should be had to the following detailed description taken in conjunction with the accompanying drawings wherein:

FIG. 1 is a perspective illustration of torque measuring apparatus constructed in accordance with the principles of the present invention;

FIG. 2 is a sectional view of the torque measuring apparatus shown in FIG. 1 taken along the axis of rotation;

FIG. 3 is a sectional view of the torque measuring apparatus shown in FIGS. 1 and 2 taken along line 3—3 of FIG. 2; and FIG. 4 is an alternate form of torque measuring coupling.

DETAILED DESCRIPTION OF THE INVENTION

Referring generally to FIGS. 1, 2 and 3, two shafts 10 and 12 are coupled for conjoint rotation about a common axis of rotation 14. Shaft 10 represents a driving shaft extending from a turbine 16 or other prime mover. Shaft 12 represents a driven shaft coupled to a load 18 to be powered. The shafts 10 and 12 are coupled together by an intermediate member or coupling apparatus 20. Within the coupling apparatus are a plurality of symmetrically positioned load cells 24, two in the preferred embodiment, although any number could be utilized, for sensing and determining the circumferential or tangential driving force between the shafts during rotational operation. The load cells 24 are commercially available sensors which generate an output signal proportional to compressive force applied thereto. Any of the well known types of sensors can be used, including those requiring electrical excitation. The load cells 24 may be coupled to a rotating transmitter 26 and power source, if required, such as a rotating battery pack or rotating transformer fitted with a centrifugal switch within the coupling apparatus 20 for operation during rotation of the shafts. Remote electronic transducing equipment, not shown, but of a type well known in the art, receives the variable output information from the load cells 24 through radio telemetry equipment or other electrical coupling components such as slip rings, also well known in the art. The transducing equipment integrates such variable information from the load cells with the number of load cells, the distance from the load cells to the axis of rotation, and an appropriate mathematical constant and provides a readout representing the torque generated between the shafts. Shaft rotational speed can be measured by any conventional method, such as, for example, by use of a pulse counter, a tachometer coupled to the shaft or other means well known in the art. The torque may be multiplied by the rotational velocity of the load cells obtained from the measured shaft speed and divided by an appropriate mathematical constant to provide a readout representing the horsepower transmitted. The electronic equipment may comprise a receiver, amplifier and other circuitry necessary to convert the signal from the load cell 24 into indications of torque. A microprocessor based or microcomputer system is readily implemented and allows variation and selection of parameters to accommodate different load cells and different distances between the axis of rotation and load cells. The transmission and collection of data from the load cells 24 and the conversion of such data to measurement of torque can be implemented by several conventional techniques which will be readily apparent to those ordinarily skilled in the art.

Any modulation of the signal, i.e., the instantaneous torque signal, obtained from this system is indicative of torque or horsepower transients, and spectrum analysis of the data may be used to detect torsional resonant conditions. The average value of the signal is representative of the steady state torque.

Adjacent the load cells 24 are a plurality of power imparting surfaces 30 securable with respect to the drive shaft 10 and a plurality of power receiving surfaces 32 securable with respect to the driven shaft 12. In the illustrative embodiment, the surfaces 30 are faces on a plurality of lugs or fingers 36 extending from a cylindrical coupling member 38. The member 38 is transitioned into any conventional flexible coupling 40, such as a gear or diaphragm type which attaches to a mating flange 42 on the driving shaft 10. The member 38 is sized to fit within a slightly larger hollow cylinder 44. The cylinder 44 may have a flange 46 at one end allowing it to be coupled to a corresponding flange 48 on the driven shaft 12. Alternatively, cylinder 44 may be transitioned into any conventional coupling which attaches to the driven shaft 12.

The cylinder 44 is provided with slots 50 into which the fingers 36 fit. The fingers 36 can be seen protruding radially from the slots 50. The surfaces 32 are surfaces along the slots 50 which contact the surfaces 30 of fingers 36. Rotation of shaft 10 causes rotation of member 38 and, by virtue of the contact between fingers 36 and slots 50, rotation of cylinder 44 and driven shaft 12.

It is preferred that the power imparting surfaces 30 be formed with a recess 52 (best seen in FIG. 3) in the faces of fingers 36. The load cells 24 are positioned in the recesses. In this manner an unanticipated overload condition will not harm the load cells since the surface of the surrounding face would contact the adjacent power surfaces 32 and limit excess compression of the load cells to thus preclude damage to the load cells through crushing. However, it will be appreciated that since power is transmitted through the load cells 24, the only portion of surface 30 which transmits force during normal operation is that portion at the bottom of the recesses 52. The remaining portion of the surface 30 only transmits power in the event of a sudden overload which compresses the cells 24 below the upper or non-recessed portion of surface 30.

As will be appreciated from the above description, the coupling apparatus 20 comprises a first cylindrical coupling member 38 axially coupled to the drive shaft 10 and to similarly shaped second hollow cylindrical coupling member 44 axially coupled to the driven shaft 12. The cylindrical coupling member 38 is preferrably a hollow cylinder as shown in FIGS. 2 and 3. The members 38 and 44 act as concentric overlapping spacers for transmitting rotational torque while permitting some degree of longitudinal flexure. The hollow coupling members are of an essentially tubular shape for the majority of their extents but are of different diameters. They are concentrically positioned one partially within the other. In order to facilitate concentric rotation with a minimum of deflection, the members 38 and 44 are journaled for rotation by one or more bearings, such as, for example, bearing members 54 and 56. The bearings also eliminate frictional engagement between member 38 and 44.

The bearing members 54, 56 are anti-friction roller bearing assemblies, two in the preferred embodiment, designed and positioned to align the joined coupling members and shafts during rotation between these members. The bearing assemblies are cylindrical in shape with their outer races secured to an inner surface of the exterior or second coupling member 44. Their inner races are secured to an exterior surface of the interior or first coupling member 38.

The flanges 40 and 46 are provided with a plurality of apertures which align with corresponding apertures in flanges 42 and 48 at the free ends of the shafts 10 and 12. Bolts and nuts 58 extending through the apertures effect the removable coupling of the shafts to the coupling members and, hence, to each other. While the coupling members 38 and 44 are shown as being fixedly coupled to corresponding shafts 10 and 12, there are many applications in which the shaft connections are desireably made through flexible couplings which can accomodate angular deflection and axial shifts. Many different types of such couplings are commercially available and their description is beyond the scope of this invention. A description of many types is given in the October, 1981 edition of DESIGN ENGINEERING magazine at pages 64–66.

Considering FIG. 3, it can be seen that the fingers 36 are attached to and extend from the inner cylindrical member 38. While only two fingers are shown, the number may be varied as necessary to support various different torque loads. The fingers 36 extend into slots 50 and the engagement between fingers 36 and slots 50 transmit torque. The notches or slots 50 are of such size as to receive the remote ends of the arms or fingers 36 and their supported load cells. The circumferential extent of the slots 50 is such as to allow for a limited rotational oscillation between the coupling members and, therefore, between the shafts. The slots 50 each have one flat face 32 extending radially with respect to the axis of rotation and which is positioned to contact a load cell 24. Such flat face constitutes a power receiving surface. Rotation of the drive shaft rotates the power imparting surfaces 30 and, through the rotating load cells 24, rotates the power receiving surfaces 32 and, hence, the driven shaft 12. The coupling members are located partially one within another to allow for the above-described coupling relationship.

To insure accurate torque measurements, it is common practice to apply torque meters between 70% and 100% of full capacity. With current torque meter designs, this requires entire coupling replacement to match the actual equipment torque to the useful range of the torque meter. The present system facilitates the matching of the torque meter to the equipment because the entire coupling is maintained and only the load cells selected from a family of load cells, are changed to adjust the system for accommodating different operating conditions.

One of the problems confronting a user of such above-described equipment is that of calibration drift, or change of reading, due to centrifugal effects when the unit is at speed. Calibration at standstill may be accomplished with a simple balanced lever arrangement which applies a true torque of known magnitude. A simulated torque that deflects the load cell can be developed by compressing the load cell to produce a load cell distortion comparable to that developed by a torque load while unloaded operation at speed can indicate the magnitude of the centrifugal effect, if any. Such methods for calibrating load cells are well known in the art.

The above described apparatus with its shafts is illustrative of a system capable of carrying out a new method of measuring torque between the drive shaft 10 and the driven shaft 12 rotating together about a common axis of rotation 14. Such method comprises the steps of providing a plurality of power imparting surfaces 30 and power receiving surfaces 32 secured with respect to the driving and driven shafts 10 and 12 at an equal predetermined distance from the axis of rotation 14. Each such power imparting and receiving surface is positioned or located essentially parallel with, radially with respect to, and at a predetermined distance from, the axis of rotation and is thus adapted to tangentially transmit a driving force with respect to the axis of rotation during operation and use. Tubular coupling members 38 and 44 are provided to couple together the power imparting surfaces 30 with their associated shaft. The method further includes the step of journaling the tubular members 38 and 44 by bearing assemblies 54 and 56, one within the other, and positioning a predetermined number of load cells 24 at the interfaces between power imparting surfaces 30 and power receiving surfaces 32 to transmit the driving force and directly sense the tangential driving force therebetween. The positioning step includes removably inserting load cells 24 into recesses adjacent the power imparting surfaces 30. The load cells 24 are selected to have a predetermined characteristic as a function of the torque anticipated to be transmitted. The method further includes the step of determining the torque at the interface between the drive shaft 10 and the driven shaft 12 during their rotation as a function of the predetermined distance, the predetermined number of load cells, and the sensed tangential driving force.

While the present invention has been described with respect to a particular embodiment, many modifications and variations will become apparent to those skilled in the art. For example, while the coupling apparatus 20 has been shown as coaxial, concentric members with fingers and slots, it will be appreciated that coupling could be achieved through a pair of U-joints such as that shown in FIG. 4. Accordingly, all such variations and modifications are intended to be included within the scope of the appended claims.

What is claimed is:

1. A system for measuring torque transmitted from a driving shaft to a driven shaft, the driving shaft and the driven shaft being axially aligned and rotatable together about a common axis of rotation comprising:

a first hollow cylindrical coupling member axially coupled to the driving shaft;

a second hollow cylindrical coupling member axially coupled to the driven shaft, the hollow coupling members being of different diameters and being concentrically positioned one partially within the other;

bearing means concentrically secured to the interior surface of an exterior coupling member and the exterior surface of an interior coupling member to abate friction between the coupling members during rotation therebetween;

a plurality of power imparting means formed in one of the coupling members, each power imparting means located at an equal predetermined distance from, and adapted to tangentially apply a force with respect to, the axis of rotation; and wherein the power imparting means includes a plurality of symmetrically disposed fingers, extending radially outwardly from the interior coupling member, each finger having a recessed surface for receiveably supporting a load cell;

a plurality of power receiving means formed in the other of the coupling members, each power receiving means located at a radial distance equal to said predetermined distance, and adapted to tangentially receive a force with respect to, the axis of rotation;

the load cells positioned at the interfaces between the power imparting and power receiving means to directly sense the tangential driving force therebetween when such load cells and adjacent power surfaces are moved into engagement through the rotation of the coupling members and shafts; and means responsive to the predetermined distance, the number of load cells, and the sensed tangential driving force for determining the torque developed between the coupling members during their rotation.

2. The system as set forth in claim 1 and further including telemetry means coupling the load cells and the torque determining means.

3. The system as set forth in claim 1 and further including a plurality of slots formed in a free edge of the exterior coupling member, the slots being symmetrically disposed for receiving an associated finger and load cell with one radial edge of each slot constituting a power receiving means.

* * * * *